United States Patent
Roberti

(12)
(10) Patent No.: US 6,915,378 B2
(45) Date of Patent: Jul. 5, 2005

(54) METHOD AND SYSTEM FOR IMPROVING THE PERFORMANCE OF A PROCESSING SYSTEM

(75) Inventor: Paolo F. Roberti, Paauhau, HI (US)

(73) Assignees: Hypernova Technologies, Inc., Reno, NV (US); RSI Corporation, Morganville, NJ (US)

( * ) Notice: Subject to any disclaimer, the term of this patent is extended or adjusted under 35 U.S.C. 154(b) by 71 days.

(21) Appl. No.: 10/422,921

(22) Filed: Apr. 23, 2003

(65) Prior Publication Data

US 2004/0215876 A1 Oct. 28, 2004

(51) Int. Cl.[7] .............................................. G06F 12/08
(52) U.S. Cl. ........................ 711/113; 711/114; 711/136
(58) Field of Search ......................... 711/111–114, 136; 710/5, 6

(56) References Cited

U.S. PATENT DOCUMENTS

| | | | | |
|---|---|---|---|---|
| 4,415,970 A | * | 11/1983 | Swenson et al. | ............ 711/130 |
| 5,687,347 A | * | 11/1997 | Omura et al. | ................ 711/112 |
| 6,438,647 B1 | * | 8/2002 | Nielson et al. | ............. 711/113 |
| 6,507,896 B2 | * | 1/2003 | Sanada et al. | .............. 711/152 |

\* cited by examiner

*Primary Examiner*—Pierre M. Vital
(74) *Attorney, Agent, or Firm*—Sawyer Law Group LLP

(57) ABSTRACT

A method and system for improving the performance of a processing system is disclosed. The processing system comprises a plurality of host computers, at least one control unit (CU) coupled to the host computer. The control unit comprises a cache and disk array coupled to the CU. The method and system comprises querying an operating system of at least one host computer to determine the storage medium that contains an object to be cached and providing the data in the portion of the disk array to be cached. The method and system further comprises providing a channel command sequence and sending the channel command sequence to the CU via an I/O operation at predetermined time intervals until the object is deactivated. A method and system in accordance with the present invention instructs a control unit (CU) or a storage medium to keep some objects constantly in its cache, so as to improve the overall response time of transaction systems running on one or more host computer and accessing data on disk via the CU.

17 Claims, 3 Drawing Sheets

Prior Art
10

METHOD AND SYSTEM FOR IMPROVING THE PERFORMANCE OF A PROCESSING SYSTEM

FIELD OF THE INVENTION

The present invention relates generally to processing systems and more particularly to a method and system for improving the response time of such a processing system.

BACKGROUND OF THE INVENTION

FIG. 1 illustrates a conventional processing system 10. The processing system 10 includes a plurality of host computers 12A–12C. Each of the host computers 12A–12C is coupled to an I/O channel 14. The I/O channel 14, in turn, is coupled to a control unit (CU) 16. The CU 16 is coupled to a storage medium such as a disk array 18. As is well known, a processing system could include a plurality of CU 16s.

The control unit CU 16 has a large cache 17 that is used to cache data being accessed by one or more host computers 12A–12C. Typically each of the host computers 12A–12C attempts to access the CU 16. The CU 16 does not have any knowledge of objects or files; it only understands blocks, tracks and cylinders. In addition, all types of data have the same importance to the CU 16. For example, data that belongs to a database index of the CU 16 does not have a different importance relative to the data that is pointed to by the index itself.

It is important for response time in the processing system 10 that data be resident in the cache 17. It is well known that data can be retrieved more quickly from the cache 17 than from the disk array. In order to decide which data to keep in the cache 17, CUs currently use the Least Recently Used (LRU) algorithm 19. That is, the least recently used data is discarded from the buffer 17 periodically. There is also a variation to handle sequential access. When sequential access is detected, data ahead of the access is pre-fetched, while data that has already been accessed is immediately discarded.

In the last few years, it has been clearly shown by experience, when caching data on the host computer, that certain objects are significantly more important than others. A typical example is that indices are significantly more important than data. The net result is that caching should not only be based on what has been accessed most recently, but also on the type of data being accessed to improve the processing system performance. As has been previously described in conventional systems the CU 16 has no information about the type of data being accessed.

Accordingly, what is needed is a system and method for improving the overall response time of the transaction systems using a host computer within a processing system by ensuring that important data is cached constantly. The present invention addresses such a need.

SUMMARY OF THE INVENTION

A method and system for improving the performance of a processing system is disclosed. The processing system comprises a plurality of host computers, at least one control unit (CU) coupled to the host computer. The control unit comprises a cache and disk array coupled to the CU. The method and system comprises querying an operating system of at least one host computer to determine the storage medium that contains an object to be cached and providing the data in the portion of the disk array to be cached. The method and system further comprises providing a channel command sequence and sending the channel command sequence to the CU via an I/O operation at predetermined time intervals until the object is deactivated.

A method and system in accordance with the present invention instructs a control unit (CU) or a storage medium to keep some objects constantly in its cache, so as to improve the overall response time of transaction systems running on one or more host computer and accessing data on disk via the CU.

DETAILED DESCRIPTION

The present invention relates generally to processing systems and more particularly to a method and system for improving the response time of such a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

In general, the OS and/or database administrators decide which objects are critical, based on such factors as application importance, overall system performance, cache availability, etc. The process of determining which objects must be kept in cache is part of the overall process of system and database tuning. Once it is determined which data is important, a system and method in accordance with the present invention improves the performance of the processing system by tricking the control unit into holding the data in the cache. For a more detailed description of the features of the present invention, refer now to the following discussion in conjunction with the accompanying figures.

Figure 1:
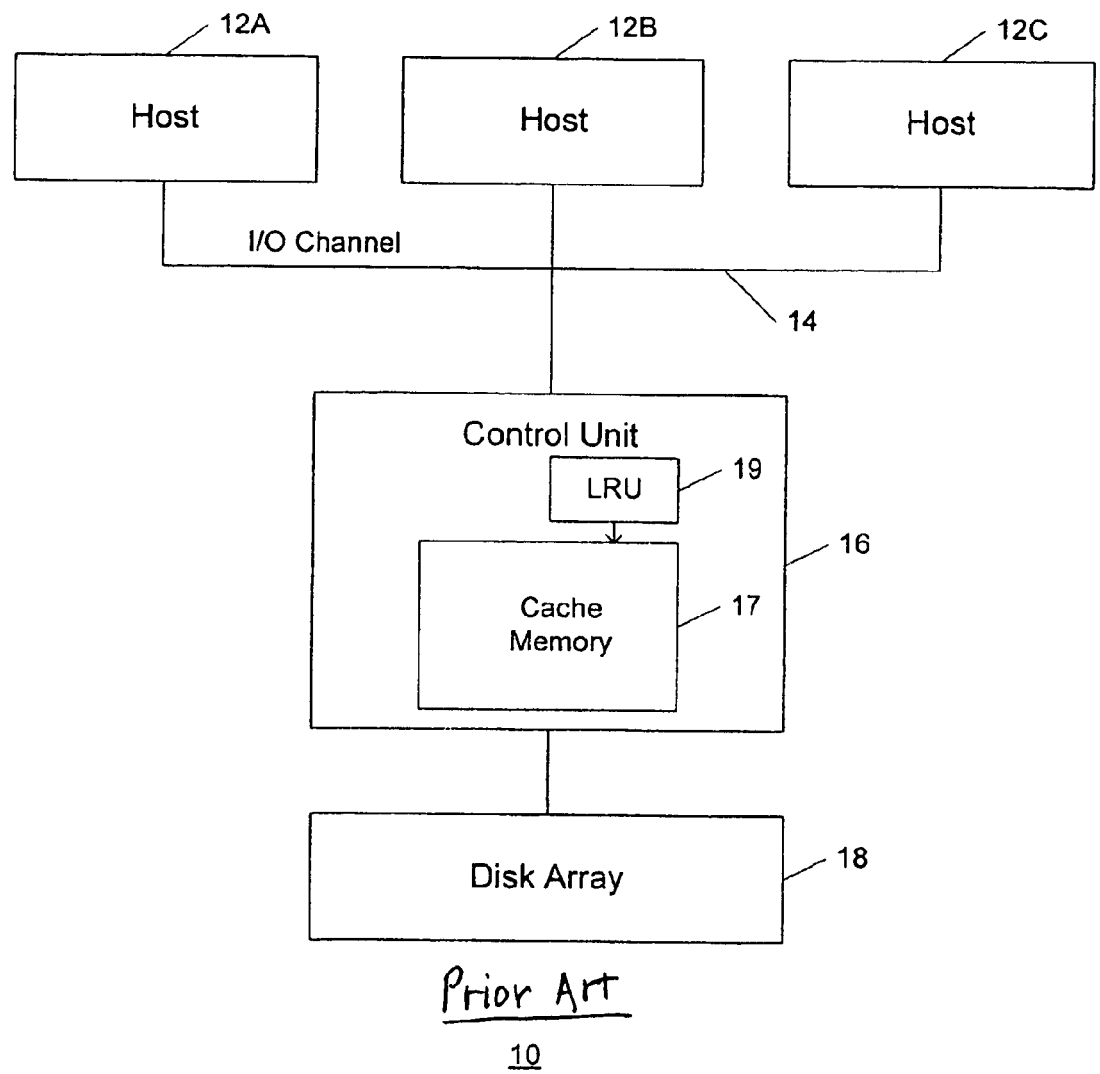
FIG. 1 illustrates a conventional processing system.
Figure 2:
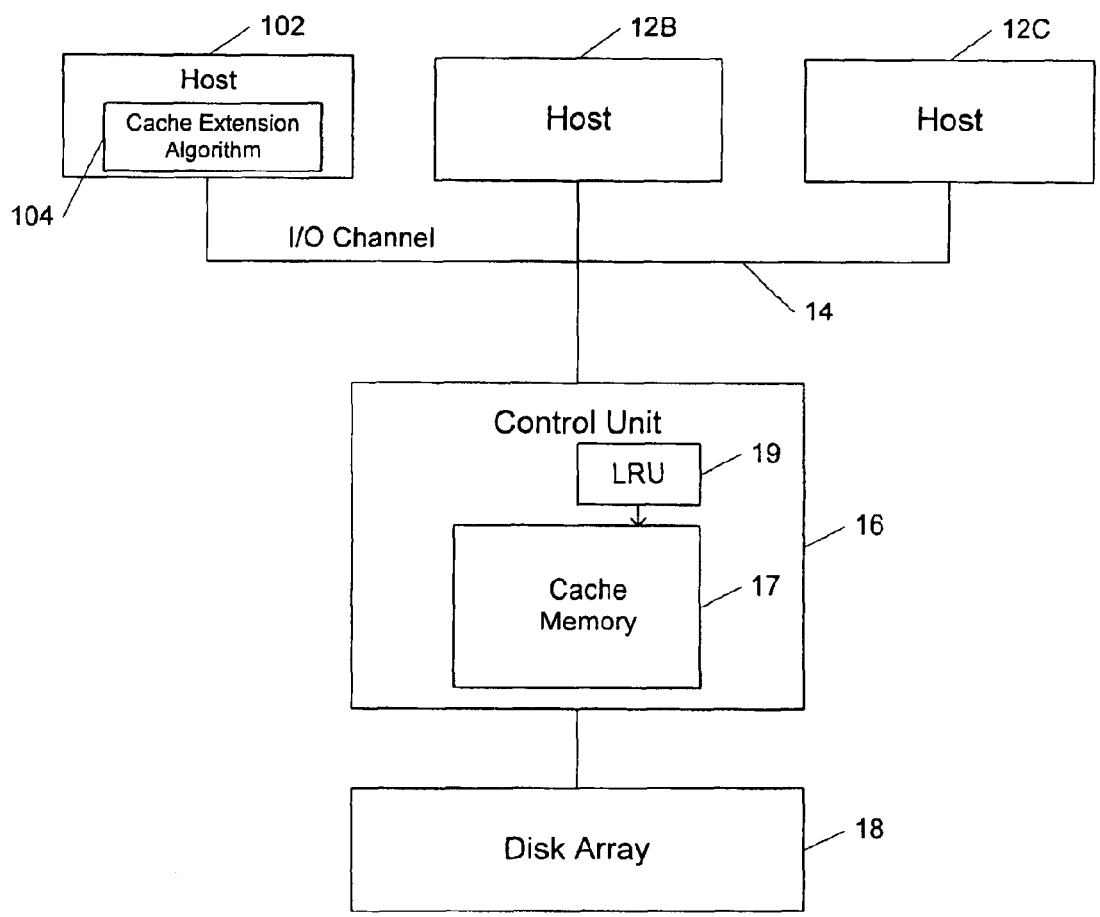
FIG. 2 is a block diagram of a processing system in accordance with the present invention.

FIG. 2 is a block diagram of a processing system in accordance with the present invention. The processing system 100 includes a CU 16' and disk array 18' which are substantially identical to that of the processing system 10 of FIG. 1. Also host computers 12B and are substantially identical to those shown in the processing system of FIG. 1. On the other hand, host computer 102 includes an algorithm 104 for extending the cache 17' of the control unit 16' such that important data is held in the cache 17' by the CU 16'. Normally, one such algorithm in one host 102 is sufficient for operation of the present invention.

Figure 3:
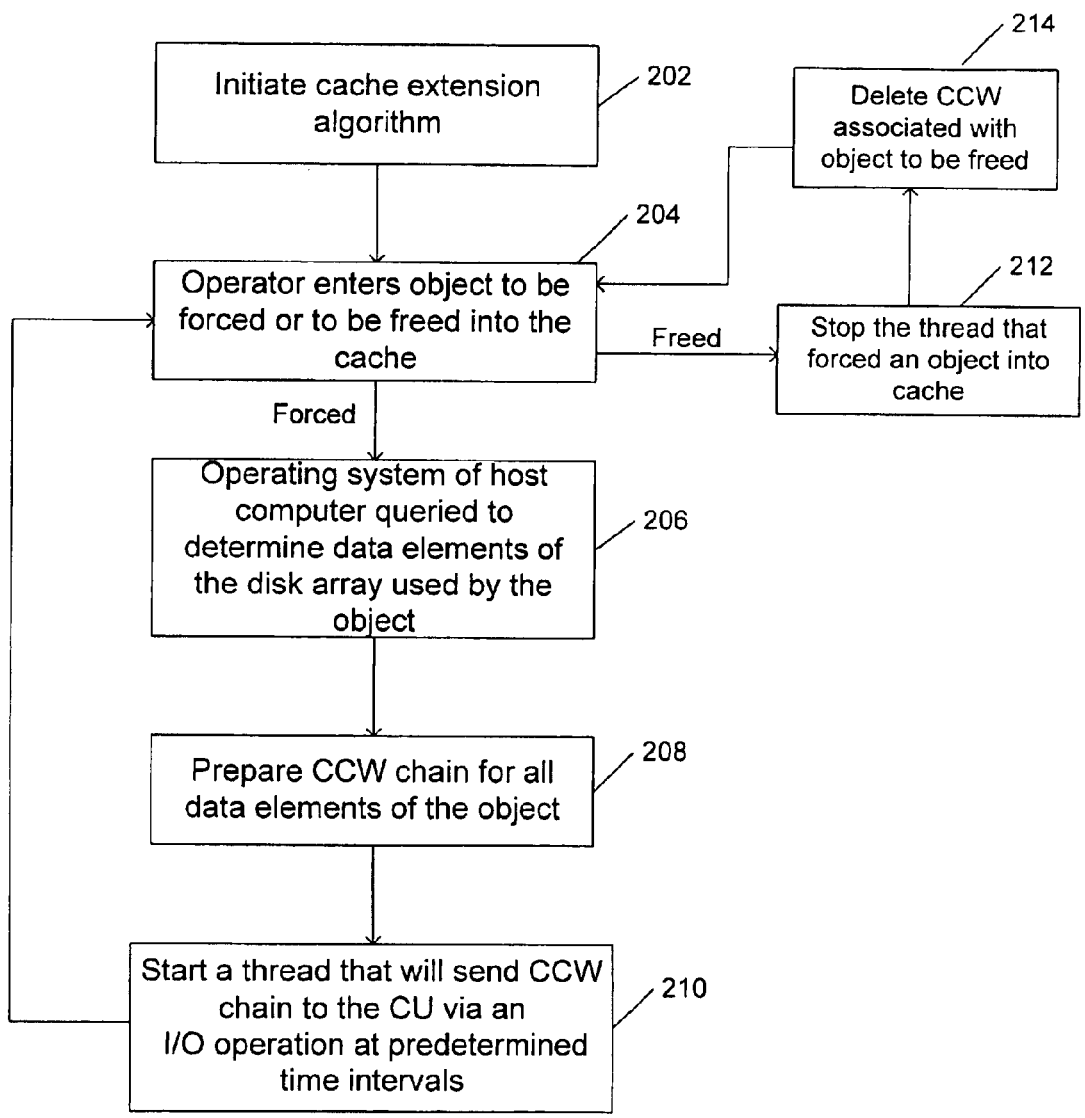
FIG. 3 is a flow chart of the algorithm that is utilized within a host computer of the processing system for extending the cache to improve the performance of the processing system.

FIG. 3 is a flow chart of the algorithm 104 that is utilized within a host computer 102 of the processing system for extending the cache 17' to improve the performance of the processing system. Referring now to FIGS. 2 and 3 together, an operator causes the host computer 102 to initiate the cache extension algorithm 104, via step 202. After being initiated by the operator, the algorithm 104 prompts the operator to enter the object to be forced or to be freed into the cache 17', via step 204. An object in this case can be either a standard z/OS file (also called an OS file) or a VSAM file. In many cases these files will contain indices and data of databases such as DB2, IMS/DB, etc. In a preferred embodiment, multiple CUs are supported.

If the object is to be freed, the thread that is to force the object into the cache is stopped, via step 212, and all channel command sequences (CCWs) associated with the object to be freed are deleted, via step 214.

If the object is to be forced into the cache, the operator enters the name of an object, the algorithm 104 queries its operating system to determine the VOLUMES and EXTENTS of the disk array 18' used by the object, via step 206. In the past, a volume used to be a physical disk. In modern disk arrays, a volume is only a logical concept.

An extent is a consecutive sequence of tracks within a volume used by the objects. An object can have multiple extents within the same volume. In a preferred embodiment, the extents are organized in a list. Each extent belongs to an active object.

Once all of the extents for the object are determined, a channel command sequence (CCW chain) for the extents is prepared, via step 208. Next, the CCW chain is sent to the CU 16' via an I/O operation at predetermined time intervals, via step 210. In a preferred embodiment, the CCW chain is started with a single set file mask followed by as many seek-read R0 CCW pairs as there are tracks in the current extent. This process continues until cache extension algorithm 104 is terminated via operator command.

In a preferred embodiment, a sequence of channel commands is sent within one I/O operation to the device (volume) containing the extent (not the CU 16' itself). However the CU 16' implicitly receives them and processes them. The frequency of this happening is conventionally 5 seconds by default, or the value set by the user.

There are no explicit instructions to the CU 16' to hold the objects in the cache 17'. The set of channels is used to trick the CU 16' to bring the objects into the cache 17' (first time) and to hold it there (following times) by triggering the LRU algorithm 19' within the CU.

From that point onward, the host computer 102 will instruct the CU 16' to keep all the tracks used by the objects in cache 17'. Note that an object can span multiple volumes controlled by different CUs.

The operator can also tell the host computer 102 to instruct the CU 16' to stop caching a specified object. The term "activate an object" is used to indicate when a CU 16' start holding a given object in cache 17'. The term "deactivate an object" is used to indicate when the CU 16s stop doing so.

Instructing the CUs to Hold an Object in Cache

Since the CUs do not have enough intelligence to be directly instructed to hold data belonging to an activated object in cache 17', they must be tricked into doing this. In this case, the approach is based on the LRU algorithm 19' used to hold data in cache 17'.

The current way of instructing the CU 16' to hold data of an activated object into cache 17' is to "touch" every few seconds, each "atomic" piece of data belonging to the object.

An atomic piece of data, here called data element, stored on disk is data that is always read whole into the cache 17' from disk, and also written whole from the cache 17' to disk. In the old type of disks, a data element was a block, while in the new disk arrays it is a track. For SCSI disks, a data element is a block.

In the case of disk arrays for z/OS, a data element is a track, even though data is transferred between the CU 16' and the host computer 102 computer in blocks that are part of a track. In other words, what is atomic between the disks and the cache 17' does not necessarily look atomic between the CU 16 and the host computer 102.

The process of "touching" data elements belonging to activated objects means reading into the host computer 102 each data element in part (if possible) or whole every few seconds. Every time a data element is touched, it is also marked by the CU 16' as the most recently used LRU algorithm 19'. The net result is that the CU 16' is tricked into keeping the data element in cache 17' for a few seconds until it is touched again.

This approach is practical only when part of the data element (and not the whole data element) can be transferred to the host computer 102, as is the case for disk arrays used by z/OS. For other cases, such as SCSI disks, different schemes must be used to avoid reading a huge amount of data into the host computer 102, which would saturate the communication channel between the CU 16 and the host computer 102 computer.

Also even though the specific implementation is tailored to Z/Os, the method and system described here can be easily implemented for other operating systems such as UNIX, Windows, Linux, etc.

z/OS

A host computer in a z/OS processing system takes full advantage of the fact that, in order to touch a track belonging to an activated object, it is only necessary to read the first block—also called record 0. The following channel commands are sent to the CU for each extent within every object:

1. Set file mask to the following values:
   a. Read only (no write commands will follow)
2. For each track within the extent:
   a. Seek Cylinder-track address
   b. Read Record 0

Record 0 is 5 bytes long and describes the track. Thus, by reading only a tiny fraction of the track, the track itself is moved to the top of the queue by CU 16' and is guaranteed to be kept in cache 17' for a few seconds.

The actual implemented read of Record 0 takes place for no more than 256 tracks belonging to the same volume at a time, to avoid locking out other programs from accessing the volume for too long a period. This is necessary for volumes that are not defined as Parallel Access Volumes (PAV). If a volume is defined as PAV, this precaution is not necessary since multiple concurrent I/Os to the volume from the same host computer 102 are possible.

The time delay used to re-read all Record Os for all the active objects is set to 5 seconds (default). This can be changed and fine-tuned to minimize the number of I/Os even though in practice, as long as volumes are defined as PAV, such fine tuning is not necessary.

Variations for z/OS

If additional intelligence is added to the CU 16', to help communicate to them the extents of the active objects, and for how long they should be kept in the cache 17', more efficient variations will be used, even though the basic idea and its advantages do not change.

A possibility is to communicate with the CU 16' using the following sequence of I/O commands for EACH extent to be kept in cache 17':

1. Send a set mask to start I/O sequence;
2. Send a seek command with the start of the extent in cylinder-track format;
3. Send a seek command with the end of the extent in cylinder-track format;

4. Repeat steps 2 to 3 at a predetermined time until the object is deactivated.

The above sequence of I/O commands uses very little resource since it does not read or write data in any way.

When the CU 16 receives the above sequence, it recognizes it and marks all tracks within the extent defined by the I/O command sequence to be kept in the cache 17 for as long as it is specified until the object is deactivated.

The further advantage of this approach are:

1. Very little data needs to be exchanged between the host computer 102 and the CU 16.

2. The CU 16 could carry out the transfer of tracks in cache 17' to the cache 17' asynchronously, thus reducing the elapse time of the I/O to complete to less than millisecond. The direct consequences is that, even when volumes are not defined as PAV, no other program would be locked out by the sequence of I/O commands.

3. It does not add a new I/O command definition for channel interface, keeping the interface as simple as possible.

This additional feature has already been implemented on our current host computer 102, but cannot be activated, since the required intelligence on the CU 16' is currently missing.

The way to activate this feature is to update the list of types of CUs that support it. Currently this is list is empty.

Variations for SCSI Disks

As mentioned above, the idea of touching all data elements of an object residing on a SCSI disk is not practical, since all the blocks of the active object would have to be read into host computer every few seconds. This would saturate the SCSI interface between the CU 16' and the host computer 102.

A difference interface can be implemented by defining a new SCSI command for disk devices, which would be followed by:

1. The number of seconds to keep the blocks in the cache 17';

2. The list of blocks belonging to the active object and to be kept in cache 17'.

The above interface is quite simple, and a virtually unlimited number of variations could be created on this basic idea.

Accordingly, a system and method in accordance with the present invention improves the performance of a processing system by tricking the CU into caching important data continuously while the data is being used. This is accomplished by providing a cache extension algorithm within at least one or more host computers within the processing system which causes the control unit to continuously hold at least a portion of the important data within the cache. This improves response time since the data is held in cache and is more quickly accessed than the data in a storage medium.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving the performance of a processing system, the processing system including a plurality of host computers, at least one control unit (CU) coupled to the host computers, the CU including a cache and disk array coupled to the CU, the disk array including a plurality of volumes, the method comprising the steps of:

(a) querying an operating system of at least one host computer to determine a storage medium that contains an object to be provided to the cached;

(b) querying the operating system for a list of extents of the object in the disk array to be provided to the cached, and (c) providing a channel command sequence wherein the channel command sequence causes the object to be provided to the cache initially and then holds the object in the cache until an operator deactivates the object; and (d) sending the channel command sequence to the CU via an I/O operation at predetermined time intervals until the object is deactivated by operator command.

2. The method of claim 1 wherein the channel command sequence causes the object to be provided to the cache initially and then holds the object in the cache subsequently by triggering a least recently used (LRU) algorithm within the CU.

3. The method of claim 1 wherein the channel command sequence is provided within one I/O operation to a device.

4. The method of claim 1 wherein the CU touches a data element within the cache at a predetermined time interval to ensure that the data element remains in the cache.

5. The method of claim 4 wherein the data element comprises a track.

6. The method of claim 4 wherein the data element comprises a block.

7. The method of claim 4 wherein the predetermined time interval comprises five seconds.

8. The method of claim 1 wherein the channel command sequence comprises reading a record that defines a track to keep the data in the cache.

9. The method of claim 1 wherein the predetermined time interval can be set through an operator command.

10. A system for improving the performance of a processing system, the processing system including a plurality of host computers, at least one control unit (CU) coupled to the host computers, the CU including a cache and disk array coupled to the CU, the disk array including a plurality of volumes, the system comprising:

means for querying an operating system of at least one host computer to determine a storage medium that contains an object to be provided to the cached;

means for querying the operating system for a list of extents of the object in the disk array to be provided to the cached, and means for providing a channel command sequence wherein the channel command sequence causes the object to be provided to the cache initially and then holds the object in the cache until an operator deactivates the object; and means for sending the channel command sequence to the CU via an I/O operation at predetermined time intervals until the object is deactivated by operator command.

11. The system of claim 10 wherein the channel command sequence causes the object to be provided to the cache initially and then holds the object in the cache subsequently by triggering a least recently used (LRU) algorithm within the CU.

12. The system of claim 10 wherein the channel command sequence is provided within one I/O operation to a device.

13. The system of claim 10 wherein the CU touches a data element within the cache at a predetermined time interval to ensure that the data element remains in the cache.

14. The system of claim 13 wherein the data element comprises a track.

15. The system of claim 13 wherein the data element comprises a block.

16. The system of claim 13 wherein the predetermined time interval comprises five seconds.

17. The system of claim 10 wherein the channel command sequence comprises reading a record that defines a track to keep the data in the cache.

* * * * *